(12) United States Patent
Ryan

(10) Patent No.: US 6,772,804 B1
(45) Date of Patent: Aug. 10, 2004

(54) DISPOSABLE DRIP GUARD

(76) Inventor: Terrance M. Ryan, 3538 Cedarbrook Rd., University Heights, OH (US) 44118

( * ) Notice: Subject to any disclaimer, the term of this patent is extended or adjusted under 35 U.S.C. 154(b) by 0 days.

(21) Appl. No.: 10/418,600

(22) Filed: Apr. 21, 2003

(51) Int. Cl.[7] ................................. B65B 3/06
(52) U.S. Cl. ........................ 141/86; 141/312
(58) Field of Search ............................ 141/86, 88, 98, 141/390, 312; 184/106; 220/571, 573; 222/108; 280/850, 851, 852

(56) References Cited

U.S. PATENT DOCUMENTS

| | | | |
|---|---|---|---|
| 2,659,523 A | * 11/1953 | Comber | 141/390 |
| 4,801,005 A | * 1/1989 | Hahn et al. | 141/98 |
| 5,020,160 A | 6/1991 | Cano | |
| 5,447,256 A | 9/1995 | Graham | |
| 5,506,040 A | 4/1996 | Cordani | |
| 5,526,900 A | 6/1996 | Mason | |
| 5,571,249 A | 11/1996 | Boylen | |
| 5,607,004 A | 3/1997 | Cope | |
| 5,834,104 A | 11/1998 | Cordani | |
| 5,839,531 A | 11/1998 | McGee | |
| 5,921,602 A | 7/1999 | Holbus | |
| 5,940,651 A | 8/1999 | Pike et al. | |
| 6,463,966 B1 | * 10/2002 | Goodger | 141/86 |

* cited by examiner

Primary Examiner—Gregory L. Huson
Assistant Examiner—Peter deVore
(74) Attorney, Agent, or Firm—John D. Gugliotta; P. Jeff Martin

(57) ABSTRACT

A disposable drip guard adapted for operable engagement with a fuel inlet of a standard motorcycle fuel tank in order to effectively absorb spilled fuel in the event of motorcycle tank overfill or fuel nozzle drip is provided. The disposable drip guard includes a plastic annular portion impervious to gasoline which forms a central, circular bore throughwhich the nozzle of a gasoline pump is inserted. The annular portion is disposed with a tri-layered fuel absorption bib.

12 Claims, 5 Drawing Sheets

DISPOSABLE DRIP GUARD

RELATED APPLICATIONS

The present invention was first described in Disclosure Document Registration 515,080 filed on Jul. 16, 2002 under 35 U.S.C. §122 and 37 C.F.R. §1.14. There are no previously filed, nor currently any co-pending applications, anywhere in the world.

BACKGROUND OF THE INVENTION

1. Field of the Invention

The present invention relates generally to fluid catchers and, more particularly, to a disposable drip guard for motorcycle fuel tanks.

2. Description of the Related Art

It is a common occurrence for fuel to splash or drip onto one's motorcycle fuel tank when filling with fuel. This usually occurs from the sudden discharge of fuel from the tank when full, or from dripped fuel from the pump's nozzle when removed from the tank. Over time, this causes substantial damage to the tank's painted finish.

Accordingly, a need has arisen for a means to effectively absorb spilled fuel in the event of motorcycle tank overfill or fuel nozzle drip. The development of the disposable drip guard fulfills this need.

A search of the prior art did not disclose any patents that read directly on the claims of the instant invention; however, the following references were considered related:

| U.S. Pat. No. | Inventor | Issue Date |
| --- | --- | --- |
| 5,571,249 | Boylen | Nov. 5, 1996 |
| 5,526,900 | Mason | Jun. 18, 1996 |
| 5,607,004 | Cope | Mar. 4, 1997 |
| 5,020,160 | Cano | Jun. 4, 1991 |
| 5,921,602 | Holbus | Jul. 13, 1999 |
| 5,940,651 | Pike et al. | Aug. 17, 1999 |
| 5,447,256 | Graham | Sep. 5, 1995 |
| 5,839,531 | McGee | Nov. 24, 1998 |
| 5,834,104 | Cordani | Nov. 10, 1998 |
| 5,506,040 | Cordani | Apr. 9, 1996 |

SUMMARY OF THE INVENTION

Therefore, it is an object of the present invention to provide a drip guard having a plurality of layers for absorbing gasoline and diesel fuels.

It is another object of the present invention to provide a drip guard being lightweight and disposable.

It is another object of the present invention to provide a drip guard which is adapted for operable engagement with the fuel inlet of a standard motorcycle fuel tank.

It is another object of the present invention to provide a drip guard which serves to protect the painted surface of a motorcycle fuel tank.

Briefly described according to one embodiment of the present invention, a disposable drip guard is adapted for operable engagement with a fuel inlet of a standard motorcycle fuel tank in order to effectively absorb spilled fuel in the event of motorcycle tank overfill or fuel nozzle drip. The disposable drip guard comprises a plastic annular portion having an elongated, hollow sleeve which engages with the fuel insert of a motorcycle fuel tank. The annular portion also forms a central, circular bore throughwhich the nozzle of a gasoline pump is inserted. The annular portion is impervious to gasoline and diesel fuel.

The annular portion is disposed with a tri-layered fuel absorption bib which is dimensionally sized so as to provide suitable surface area coverage of a substantial portion of the motorcycle fuel tank.

The absorption bib includes an upper layer defined as a nonflammable, absorbent layer, a medial layer defined as a fuel-impervious layer, and a lower layer defined as a tank contacting layer fabricated of an absorbent layer of nonwoven fibers which impart a degree of smoothness and softness.

The use of the present invention allows for the effective absorption of spilled fuel in the event of tank overfill or fuel nozzle drip in a manner which is quick, easy, and efficient.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENT

1. Detailed Description of the Figures

Figure 1:
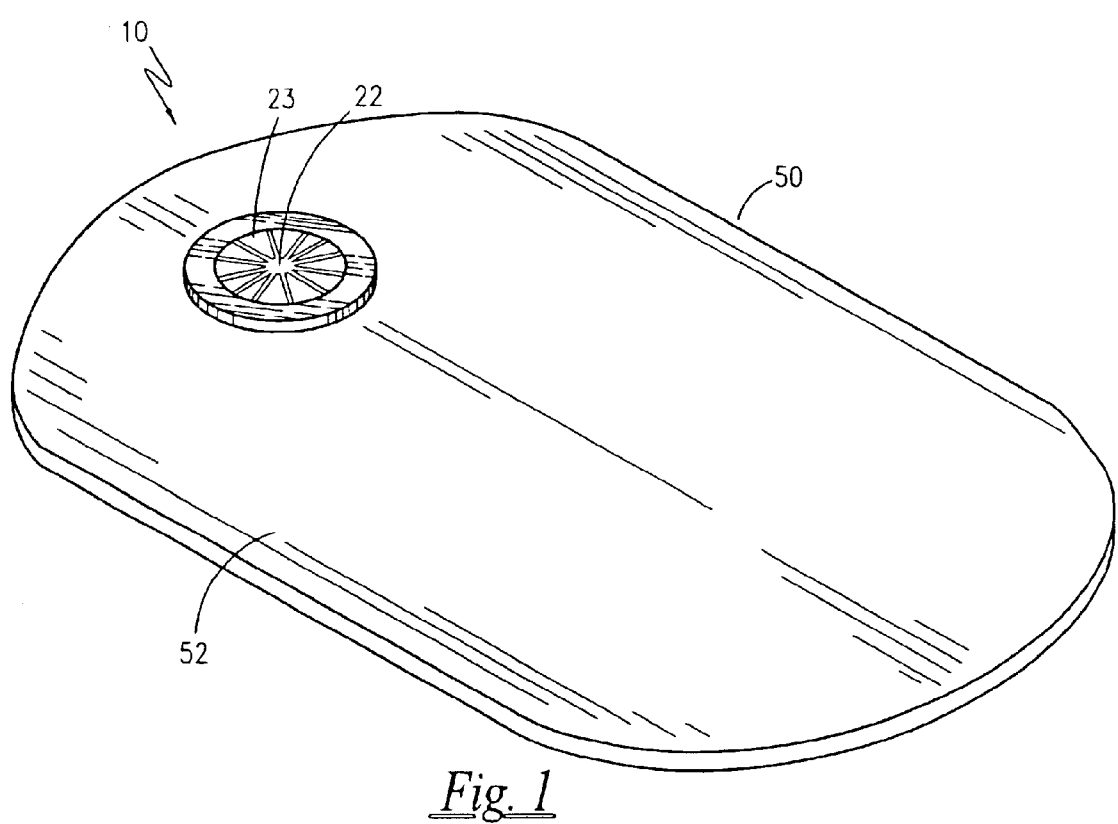
FIG. 1 is a perspective view of a disposable drip guard according to the preferred embodiment of the present invention.
Figure 2:
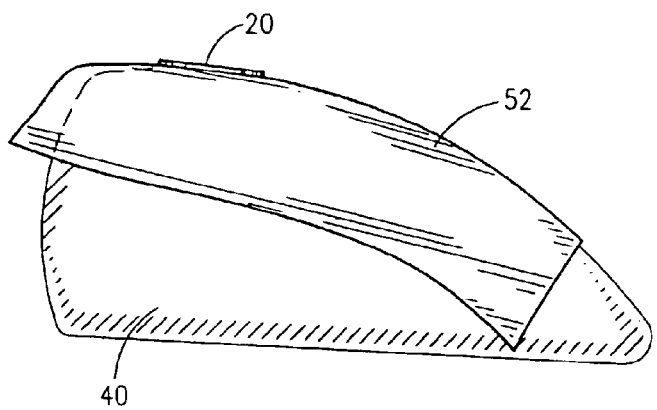
FIG. 2 is a side elevational view of the present invention shown overlapping a motorcycle fuel tank according to the preferred embodiment.

Referring now to FIGS. 1–7, a disposable drip guard 10 is shown, according to the present invention, adapted for operable engagement with a fuel inlet 42 of a standard motorcycle fuel tank 40 for effectively absorbing spilled fuel in the event of motorcycle tank 40 overfill or fuel nozzle 48 drip. The disposable drip guard 10 is comprised of an annular portion 20 forming a central, circular bore 22, wherein central, circular bore 22 defines a neck portion 23 extending radially therefrom being formed of a flexible, returnably resilient plastic material being impervious to gasoline and diesel fuel. Upon insertion of a fuel nozzle 48 through the central, circular bore 22, the neck portion 23 collapses downward to form a downwardly protruding sleeved spout 29 which serves to provide a nozzle inlet guide. The neck portion 23 flexibly accommodates the fuel nozzle 48 and impinges thereagainst upon nozzle 48 mating with central, circular bore 22. The sleeved spout 29 is configured for insertably engaging the fuel inlet 42 of the standard motorcycle fuel tank 40. The central, circular bore 22 has a diametrical measure suitable for accommodating fuel nozzles 48 which are utilized and otherwise common in the fuel dispensing industry.

Figure 3:
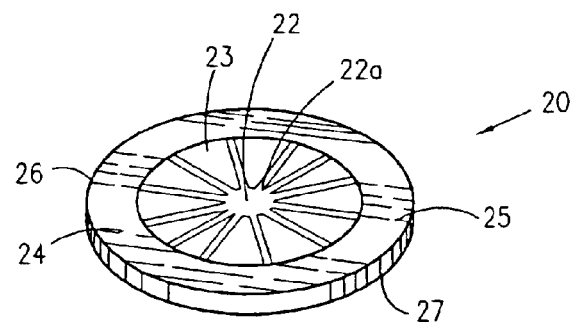
FIG. 3 is perspective view of the annular portion according to the preferred embodiment of the present invention.
Figure 4:
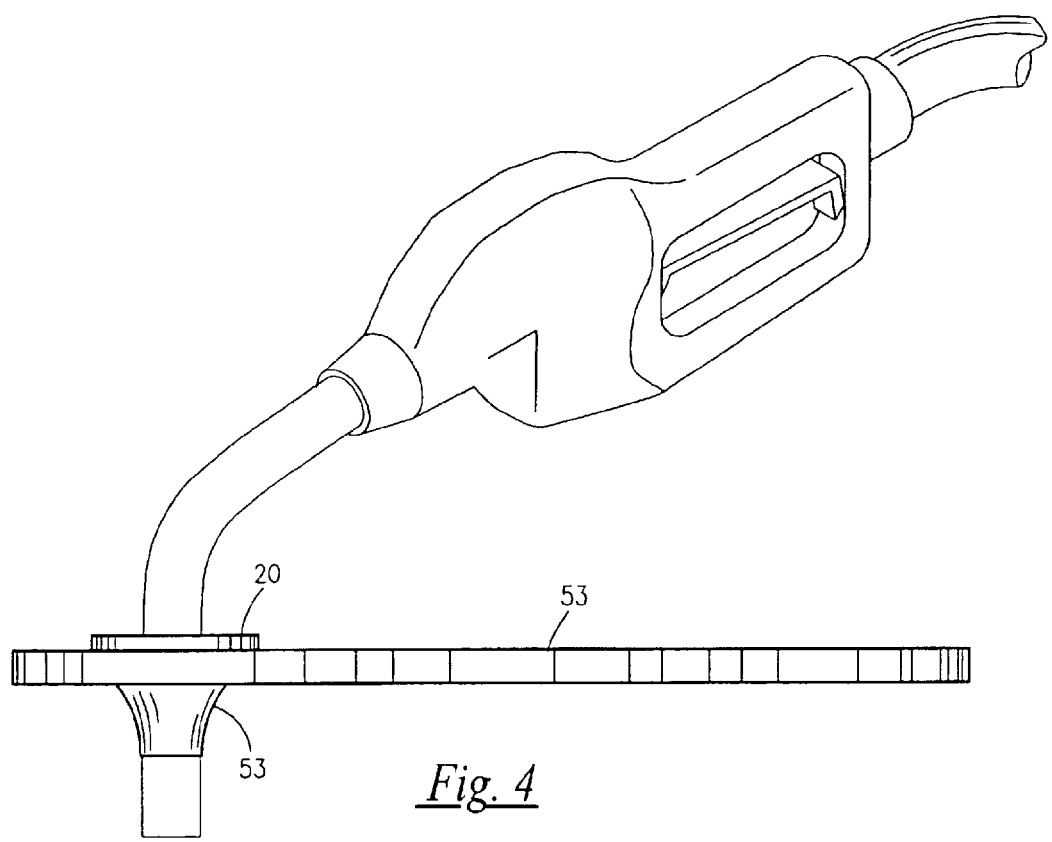
FIG. 4 is a side elevational view of the disposable drip guard shown with a fuel nozzle inserted therethrough according to the preferred embodiment of the present invention.
Figure 5:
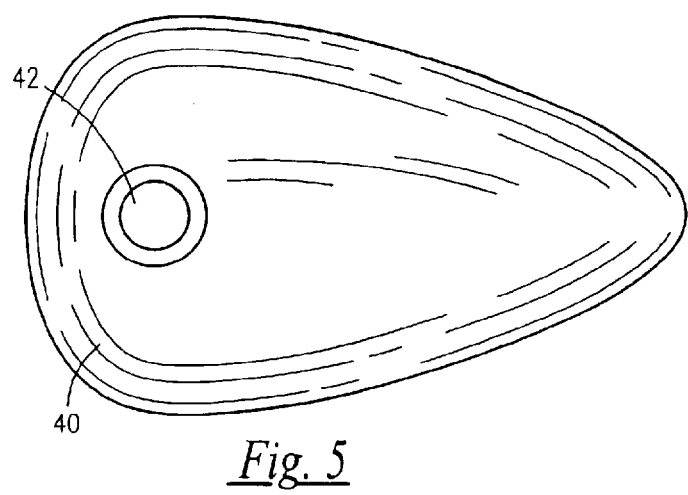
FIG. 5 is a top side view of a standard motorcycle fuel tank.
Figure 6:
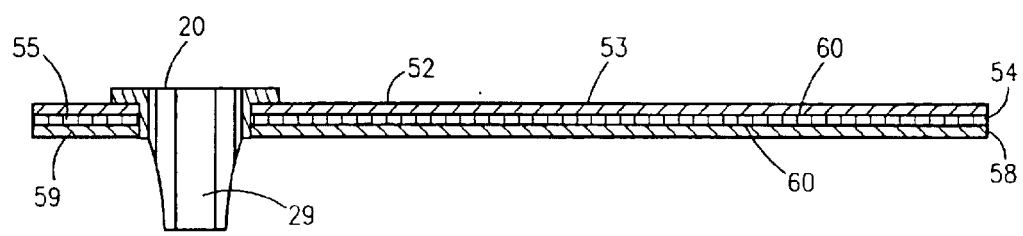
FIG. 6 is a cross-sectional view of the disposable drip guard showing the neck portion collapsed downward forming the downwardly protruding sleeved spout according to the preferred embodiment of the present invention.
Figure 7:
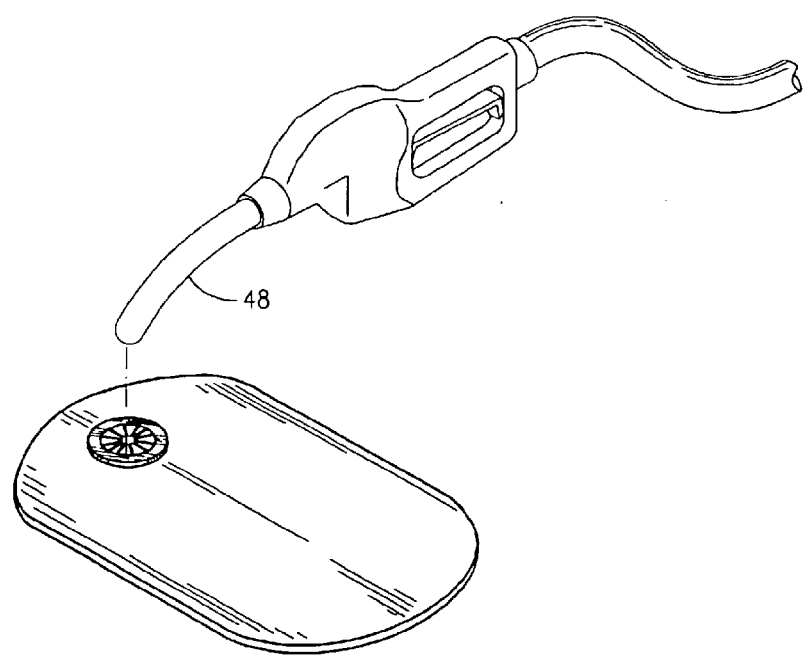
FIG. 7 is an exploded perspective view of the present invention illustrating insertion of a fuel nozzle therethrough.
Figure 8:
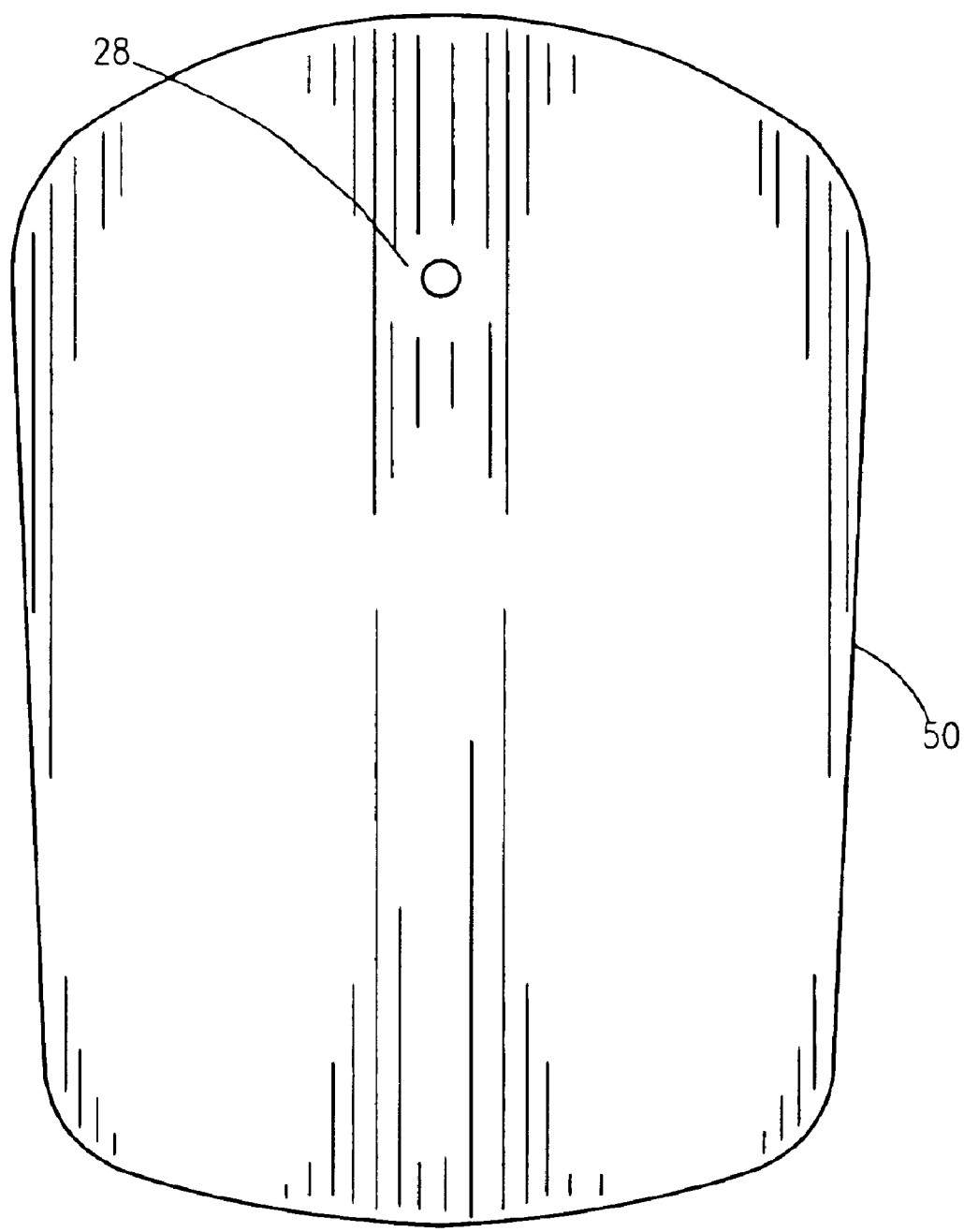
FIG. 8 is a bottom side view of the tri-layered fuel absorption bib showing the foramen according to the preferred embodiment of the present invention.

Referring more specifically to FIG. 3, a circular planar shoulder 24 projects radially from an outer periphery of the neck portion 23, and perpendicularly with respect to an inner, longitudinal sidewall 22a of central, circular bore 22. The circular planar shoulder 24 is bound by a circular perimeter 26. The circular planar shoulder 24 includes a top surface 25 opposed by a bottom surface 27. Preferably, the annular portion 20 is fabricated of a lightweight, rigid or semi-rigid plastic or rubber material being impervious to motorcycle service fluids, including but not limited to gasoline, diesel fuel, motor oil, and transmission fluid.

Referring now to FIGS. 1–7, in order to facilitate effective absorption of spilled fuel, the annular portion 20 is disposed with a tri-layered fuel absorption bib 50, wherein an upper surface of bib 50 is adhered to the entire bottom surface 27 of circular planar shoulder 24, including an external lower surface of the neck portion 23, and wherein said bib 50 projects outwardly therefrom forming a generally rectangular configuration. The annular portion 20 is positioned near an upper central portion of bib 50, and wherein bib 50 includes a foramen 28 extending therethrough aligned linearly with the central, circular bore 22. The bib 50 is dimensionally sized so as to provide suitable surface area coverage of a substantial portion of the motorcycle fuel tank 40.

The absorption bib 50 includes an upper layer 52 defined as a nonflammable, absorbent layer 53 fabricated of non-woven polypropylene or polyester/polyethylene conjugate fibers.

The absorption bib 50 further includes a medial layer 54 defined as a fuel-impervious layer 55 fabricated of a pliable, lightweight plastic material which provides a barrier against chemicals including gasoline and diesel fuel. Alternatively, the fuel-impervious layer 55 may be fabricated of a flexible, thin layer of a polyurethane elastomeric material.

The absorption bib 50 still further includes a lower layer 58 defined as a tank contacting layer 59 fabricated of an absorbent layer of non-woven fibers which impart a degree of smoothness and softness, thereby ensuring finished tank surface 41 is unabraded or not scratched during use.

The upper, medial, and lower layers 52, 54, 58 are bonded together by thermal activated adhesive 60 placed therebetween and subsequently subjected to pressure and heat.

It is envisioned that the disposable drip guard 10 may be made available by owners or operators of motor vehicle service stations as a single-use disposable item dispensed via a coin-operated vending machine. The item would be folded and stored in individually wrapped packets, whereby each drip guard 10 would be removed therefrom and unfolded for use. After use, the invention would be discarded within a suitable disposal container.

It is further envisioned that a disposable drip guard may be adapted for operable engagement with a fuel inlet of a conventional motor vehicle fuel tank for effectively absorbing spilled fuel.

2. Operation of the Preferred Embodiment

To use the present invention, the user simply removes fuel cap off of motorcycle fuel tank 40 and overlaps the absorption bib 50 thereover so as to have the annular portion 20 residing atop the fuel inlet 42 of fuel tank 40. Next, user inserts fuel nozzle 48 through the central, circular bore 22 of annular portion 20 and fills fuel tank 40 with fuel. Finally, user discards the disposable drip guard 10 within a suitable disposal container.

The use of the present invention allows for the effective absorption of spilled fuel in the event of tank overfill or fuel nozzle drip in a manner which is quick, easy, and efficient.

Therefore, the foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents. Therefore, the scope of the invention is to be broadly limited only by the following claims.

What is claimed is:

1. The drip guard comprising:
   an annular portion, said annular portion forms a central, circular bore; and
   a tri-layered fuel absorption bib disclosed on said annular portion, wherein said central, circular bore defines a neck portion extending radially from said central, circular bore, said neck portion is formed of a flexible, returnably resilient plastic material being impervious to gasoline and diesel fuel, whereupon insertion of a fuel nozzle through the central, circular bore, said neck portion collapses downward to form a downwardly protruding sleeved spout which serves to provide a nozzle inlet guide, wherein said neck portion allows for flexible accommodation of the fuel nozzle and impingement there against upon the nozzle mating with said central, circular bore, and wherein said sleeved spout is configured for insertably engaging a fuel inlet of a standard motorcycle fuel tank.

2. The drip guard of claim 1, wherein said central, circular bore has a diametrical measure suitable for accommodating fuel nozzles which are utilized and otherwise common in fuel dispensing industry.

3. The drip guard of claim 1, wherein said annular portion is fabricated of a lightweight, rigid or semi-rigid plastic or rubber material being impervious to motorcycle service fluids including but not limited to gasoline, diesel fuel, motor oil, and transmission fluid.

4. The drip guard of claim 1, wherein said neck portion includes a circular planar shoulder which projects radially from an outer periphery of said neck portion, and said circular planar shoulder is aligned perpendicularly with respect to an inner, longitudinal sidewall of said central, circular bore.

5. The drip guard of claim 4, wherein said circular planar shoulder is bound by a circular perimeter, said circular planar shoulder includes a top surface opposed by a bottom surface, and wherein an upper surface of said tri-layered fuel absorption bib is adhered to an entire said bottom surface of said circular planar shoulder, including an external lower surface of said neck portion, and wherein said tri-layered fuel absorption bib projects outwardly therefrom forming a generally rectangular configuration.

6. The drip guard of claim 1, wherein said tri-layered fuel absorption bib comprises an upper layer, a medial layer, and a lower layer, wherein said tri-layered fuel absorption bib includes a foramen extending therethrough and aligned linearly with said central, circular bore, and wherein said tri-layered fuel absorption bib is dimensionally sized so as to provide suitable surface area coverage of a substantial portion of the motorcycle fuel tank.

7. The drip guard of claim 6, wherein said upper layer is defined as a nonflammable, absorbent layer fabricated of non-woven polypropylene or polyester/polyethylene conjugate fibers.

8. A drip guard comprising:
an annular portion, said annular portion forms a central, circular bore; and
a tri-layered fuel absorption bib disposed on said annular portion, wherein said tri-layered fuel absorption bib comprises an upper layer, a medial layer, and a lower layer wherein said tri-layered fuel absorption bib includes a foramen extending therethrough and aligned linearly with said central, circular bore, and wherein said tri-layered fuel absorption bib is dimensionally sized so as to provide suitable surface area coverage of a substantial portion of the motorcycle fuel tank, wherein said medial layer is defined as a fuel-impervious layer fabricated of a pliable, lightweight plastic material which provides a barrier against chemicals including gasoline and diesel fuel.

9. A drip guard comprising:
an annular portion, said annular portion forms a central, circular bore; and
a tri-layered fuel absorption bib disposed on said annular portion, wherein said tri-layered fuel absorption bib comprises an upper layer, a medial layer, and a lower layer, wherein said tri-layered fuel absorption bib includes a foramen extending therethrough and aligned linearly with said central, circular bore, and wherein said tri-layered fuel absorption bib is dimensionally sized so as to provide suitable surface area coverage of a substantial portion of the motorcycle fuel tank wherein said lower layer is defined as a tank contacting layer fabricated of an absorbent layer of non-woven fibers which impart a degree of smoothness and softness, thereby ensuring finished fuel tank surface is unabraded or not scratched during use.

10. A drip guard comprising:
an annular portion, said annular portion forms a central, circular bore; and
a tri-layered fuel absorption bib disposed on said annular portion, wherein said tri-layered fuel absorption bib comprises an upper layer, a medial layer, and a lower layer, wherein said tri-layered fuel absorption bib includes a foramen extending therethrough and aligned linearly with said central, circular bore, and wherein said tri-layered fuel absorption bib is dimensionally sized so as to provide suitable surface area coverage of a substantial portion of the motorcycle fuel tank, wherein said upper layer, said medial layer, and said lower layer are bonded together by thermal activated adhesive placed between said upper layer and said medial layer and between said medial layer and said lower layer, and wherein said thermal activated adhesive is subsequently subjected to pressure and heat.

11. The drip guard of claim 8, wherein said fuel-impervious layer is fabricated of a flexible, thin layer of a polyurethane elastomeric material.

12. The drip guard of claim 1, wherein said drip guard is disposable, and wherein each said drip guard is sealed within individually wrapped packets made available by owners or operators of motor vehicle service stations as a single-use disposable item dispensed via a vending machine.

* * * * *